US012146356B2

(12) United States Patent
Yim et al.

(10) Patent No.: US 12,146,356 B2
(45) Date of Patent: Nov. 19, 2024

(54) DOOR HINGE DEVICE FOR VEHICLES

(71) Applicants: HYUNDAI MOTOR COMPANY, Seoul (KR); Kia Corporation, Seoul (KR); PYEONG HWA AUTOMOTIVE CO., LTD., Daegu (KR)

(72) Inventors: Chungsik Yim, Anyang-si (KR); Soo Bok Kim, Incheon (KR); Hyungin Yun, Seoul (KR); Ki-Ryun Ahn, Daegu (KR)

(73) Assignees: HYUNDAI MOTOR COMPANY, Seoul (KR); KIA CORPORATION, Seoul (KR); PYEONG HWA AUTOMOTIVE CO., LTD., Daegu (KR)

( * ) Notice: Subject to any disclaimer, the term of this patent is extended or adjusted under 35 U.S.C. 154(b) by 131 days.

(21) Appl. No.: 17/965,405

(22) Filed: Oct. 13, 2022

(65) Prior Publication Data

US 2023/0220719 A1 Jul. 13, 2023

(30) Foreign Application Priority Data

Jan. 7, 2022 (KR) ........................ 10-2022-0002596

(51) Int. Cl.
*E05D 15/58* (2006.01)
*E05F 15/622* (2015.01)
*E05F 15/652* (2015.01)

(52) U.S. Cl.
CPC ............ *E05D 15/58* (2013.01); *E05F 15/622* (2015.01); *E05F 15/652* (2015.01); *E05D 2015/586* (2013.01); *E05Y 2900/531* (2013.01)

(58) Field of Classification Search
CPC ... E05F 15/652; E05F 15/101; E05F 15/1081; E05F 15/622; E05D 15/58; E05D 2015/586; E05D 15/101; E05D 15/1081; E05D 2015/1089; E05Y 2900/531; B60J 5/06; B60J 5/047
See application file for complete search history.

(56) References Cited

U.S. PATENT DOCUMENTS 5,967,595 A * 10/1999 Heya .......................... B60J 5/06 49/213
5,979,971 A * 11/1999 Mizuki ................... B60L 50/66 49/213
6,183,039 B1 * 2/2001 Kohut ................. E05D 15/1081 296/146.12

(Continued)

FOREIGN PATENT DOCUMENTS

KR 10-2019-0028966 A 3/2019
KR 10-2022-0002596 A 3/2019

*Primary Examiner* — Justin B Rephann
(74) *Attorney, Agent, or Firm* — MORGAN, LEWIS & BOCKIUS LLP

(57) ABSTRACT

In a door hinge device for the vehicle, in a vehicle without a B pillar, a hinge slider connected to a hinge portion of a door slides and moves in an external diagonal direction of a vehicle body along upper and lower rails by a driving torque of a motor inside a case, securing a rotation trajectory of the door, and then a striker fixed to the hinge slider is restrained by a latch portion fixed to the case to fix the slide movement position of the hinge slider, ensuring stability of the opening/closing operation of the door.

17 Claims, 13 Drawing Sheets

(56) References Cited

U.S. PATENT DOCUMENTS

| | | | | |
|---|---|---|---|---|
| 6,412,222 | B1 * | 7/2002 | Hashiba | B60J 5/06<br>49/168 |
| 6,826,869 | B2 * | 12/2004 | Oberheide | E05F 15/638<br>49/360 |
| 7,798,557 | B2 * | 9/2010 | Elliott | B60J 5/06<br>296/146.12 |
| 8,245,447 | B2 * | 8/2012 | Oh | E05C 17/60<br>49/164 |
| 9,499,031 | B2 * | 11/2016 | Choi | B60J 5/06 |
| 10,443,282 | B2 * | 10/2019 | Bauer | E05D 15/1047 |
| 11,414,905 | B2 * | 8/2022 | Yun | E05B 83/40 |
| 11,555,343 | B2 * | 1/2023 | Yun | B60J 5/047 |
| 2009/0000200 | A1 * | 1/2009 | Heuel | B60J 5/062<br>296/202 |
| 2009/0072583 | A1 * | 3/2009 | Elliott | B60J 5/0479<br>296/24.3 |
| 2010/0018125 | A1 * | 1/2010 | Oh | E05F 15/40<br>49/449 |
| 2015/0183303 | A1 * | 7/2015 | Choi | E05D 15/101<br>49/404 |

* cited by examiner

DOOR HINGE DEVICE FOR VEHICLES

CROSS-REFERENCE TO RELATED APPLICATION

The present application claims priority to Korean Patent Application No. 10-2022-0002596 filed on Jan. 7, 2022, the entire contents of which is incorporated herein for all purposes by this reference.

BACKGROUND OF THE PRESENT DISCLOSURE

Field of the Present Disclosure

The present disclosure relates to a door hinge device for a vehicle. More particularly, the present disclosure relates to a door hinge device for a vehicle that enables an independent opening/closing operation of each door by securing a rotation trajectory by pushing a hinge portion of a door to an outside of a vehicle body in a vehicle without a B pillar.

Description of Related Art

In general, a vehicle door as a door that separates the inside and outside of the vehicle blocks external noise, rain, dust, wind, etc., and has an important function of absorbing an impact together with the side structure to safely protect occupants in an event of a side collision.

There are various types of vehicle doors, including special-purpose doors, but swing doors of a hinge-type are most often applied to passenger vehicles.

In general, the swing door refers to a door that opens to the outside of the vehicle body around a hinge axis provided to the vehicle body through a hinge bracket interposed therebetween, and has advantages of easy opening and closing and a simple structure, so maintenance and repair are easy.

On the other hand, in some vehicles, when the door is opened, an open feeling is large, and an opposing swing door is applied, which is advantageous for getting the passengers on or off.

These opposing swing doors are divided into a type without a B pillar and a type with a B pillar.

FIG. 1 is a side view showing a vehicle to which an opposing swing door according to an example of related art is applied, and FIG. 2 is a cross-sectional view showing a part where a front door and a rear door are in contact in the vehicle of FIG. 1.

First, referring to FIG. 1 and FIG. 2, an example of the opposing swing door applied to the vehicle 100 without the B pillar is shown. In the front door 110, the hinge portion is provided at the front end portion of the front door 110, and in the rear door 120, the hinge portion is provided at the rear end portion of the rear door 120.

In the present opposing swing door, a latch portion LC is provided on one side of the front door 110 or the rear door 120 to maintain the locked state.

Furthermore, a seal S for air-tightness is provided between the rear end portion of the front door 110 and the front end portion of the rear door 120.

As described above, the opposing swing door of the vehicle 100 without the B pillar has a good open feeling when riding or leaving the vehicle or leisure activities, however during the opening and closing operation of the front door 110 and the rear door 120, there is a drawback in that the opening and closing order is predetermined, such as having to open or close the front door 110 first or later due to the overlapping rotation trajectory between the front door 110 and the rear door 120.

Accordingly, because the opening and closing order of the front door 110 and the rear door 120 is predetermined, there is a problem that the rear door 120 cannot be opened or closed alone.

FIG. 3 is a side view showing a vehicle to which an opposing swing door according to another example of a related art is applied, and FIG. 4 is a cross-sectional view showing a part where a front door and a rear door are in contact with each other in a vehicle of FIG. 3.

Referring to FIG. 3 and FIG. 4, an example of the opposing swing door applied to the vehicle 200 with the B pillar 230 is shown. Also, in the front door 210, a hinge portion is provided to the front end portion of the front door 210, and the hinge portion is provided to the rear end portion of the rear door 220 in the rear door 220.

In the present opposing swing door, a latch portion LC is provided between each one side of the front door 210 and the rear door 220, and the B pillar 230 to maintain the locking state.

Furthermore, a seal S for air-tightness is provided between the rear end portion of the front door 210 and the front end portion of the rear door 220, corresponding to the B pillar 230, and the B pillar 230.

Accordingly, because the opposing swing door of the vehicle 100 with the B pillar is configured so that the front door 210 and the rear door 220 rotate with respect to the B pillar 230, each of the independently operation of the opening and closing is possible, which has the advantage of a free operation order, however due to the application of the B pillar 230, there is a problem that the feeling of the openness is reduced when riding or leaving the vehicle or the leisure activities.

Accordingly, there is a difference in the sense of the sense of the openness of the opposing swing door and there is a difference in the opening and closing operation of the front door and the rear door in accordance with the presence or absence of the B pillar.

On the other hand, as described above, to solve the problem of the operation sequence of the front door 110 and the rear door 120 while maintaining the open feeling of the vehicle 100 without the B pillar, conventionally, as the door hinge device of the opposing swing door, there is an example in which the hinge device of a gooseneck type is applied, however the hinge device of the present gooseneck type requires a lot of free space in the vehicle body width direction due to its shape characteristic, so it is difficult to configure the vehicle body layout.

Accordingly, to apply the opposing swing door to the vehicle without the B pillar, a door hinge device for realizing a new opening and closing structure is required.

The information included in this Background of the present disclosure is only for enhancement of understanding of the general background of the present disclosure, and may not be taken as an acknowledgement or any form of suggestion that this information forms the prior art already known to a person skilled in the art.

BRIEF SUMMARY

Various aspects of the present disclosure are directed to providing a door hinge device for a vehicle in which, in a vehicle without a B pillar, a hinge slider connected to a hinge portion of a door slides and moves in an external diagonal direction of a vehicle body along upper and lower rails by a driving torque of a motor inside a case, securing a rotation trajectory of the door, and then a striker fixed to the hinge slider is restrained by a latch portion fixed to the case to fix the slide movement position of the hinge slider, ensuring stability of the opening/closing operation of the door.

In one or a plurality of embodiments of the present disclosure, a door hinge device for a vehicle including a case provided on one side of a vehicle body corresponding to one end portion of a door in a diagonal direction toward the outside of the vehicle body, a rail disposed in a longitudinal direction on an upper and lower sides of the case, respectively, and a hinge slider connected through a hinge axis to a door hinge bracket fixed to the one end portion of the door in a slidably provided state along the rail inside the case, includes: a striker provided on one side of the hinge slider; and a latch portion provided on one side inside the case, and restraining or releasing the striker through a claw lever and a pawl lever on a base plate at a position where the hinge slider slides and moves in an external diagonal direction of a vehicle body.

One end portion of the door may be formed of a front end portion of a front door or a rear end portion of a rear door.

The door hinge device may further include a driving unit including a motor and providing a driving torque so that the hinge slider connected to the inside of the case through a nut bracket on a screw disposed in a longitudinal direction slides and moves along the rail by motor driving.

The driving unit may include: a motor fixed on an internal cross-section of the case; a reducer engaged to a motor shaft of the motor to reduce a torque of the motor and output the reduce torque; a screw disposed parallel to the rail and including one end portion connected to the reducer and the other end portion provided rotatably on the internal cross-section of the case through a bearing member; and a nut bracket movably provided on the screw and including one side fixed to the hinge slider.

The striker may be fixed upwards to the lower side of the hinge slider.

In the latch portion, in a state in which the hinge slider slides and moves in the external diagonal direction of the vehicle body, the base plate may be fixed to the internal cross-section of the case to restrain the striker through the claw lever.

The latch portion may include: a base plate fixed to one side of the internal cross-section of the case and including an insert groove formed on one side thereof corresponding to the striker; a claw lever including a restraining groove formed on a first side thereof to restrain the striker and a protruding latching end portion formed on a second side thereof to limit a unidirectional rotation, and rotatably pin-coupled to the base plate by corresponding to the inside of the insert groove; a pawl lever including a supporting end portion formed on a first side thereof and protruded to act to the latching end portion, a release end portion formed to be protruded on a second side thereof, a detecting end portion formed to be protruded on one side between the supporting end portion and the release end portion, a damping end portion formed to be protruded on a side thereof between the supporting end portion and the release end portion, and rotatably pin-coupled to the base plate by corresponding to one side of the claw lever; a release gear rotatably provided on the base plate through a gear shaft by corresponding to the pawl lever and including a release protrusion formed on the lower side and acting on the release end portion of the pawl lever; and a release motor fixed to the base plate adjacent to the release gear and including a motor gear engaged in the release gear and fixed to the motor shaft.

The release gear may include a worm wheel, and the motor gear includes a worm.

The latch portion may further include a pole switch fixed to the base plate by corresponding to the detecting end portion of the pawl lever to detect a rotation position of the pawl lever.

The latch portion may further include: a claw damper provided on one side of the base plate to suppress rotation of the claw lever by supporting one side of the claw lever; and a pole damper provided on the other side of the base plate to suppress rotation of the pawl lever by supporting the damping end portion of the pawl lever.

The latch portion may further include: a claw spring mounted onto a pin of the claw lever and elastically supporting the claw lever in the rotation direction to release the restraint of the striker; and a pole spring mounted onto a pin of the pawl lever and elastically supporting the pawl lever in the rotating direction, where the supporting end portion supports the latching end portion of the claw lever.

The hinge slider may include: an internal hinge slider in which upper and lower sides are slidably connected along the rail through the slider, respectively, inside the case; and an external hinge slider integrally connected to the internal hinge slider through a guide slot formed on an external surface of the case outside the case and including an end portion hinged to the door hinge bracket through a hinge shaft.

The external hinge slider may include: an upper external hinge bar integrally connected to an upper one side of the internal hinge slider through an upper guide slot formed on the external surface of the case outside the case; a lower external hinge bar integrally connected to a lower one side of the internal hinge slider through a lower guide slot formed under the external surface of the case outside the case; and an external connection bar interconnecting the upper and lower external hinge bars outside the case.

The door hinge bracket may include: an upper door hinge bracket fixed to an upper side of one end portion of the door and hinged to a front end portion of the upper external hinge bar through a hinge shaft; and a lower door hinge bracket fixed to a lower side of one end portion of the door and hinged to a front end portion of the lower external hinge bar through a hinge shaft.

In the door hinge device for the vehicle according to various exemplary embodiments of the present disclosure, in a vehicle without a B pillar, a hinge slider connected to a hinge portion of a door may slide and move in an external diagonal direction of a vehicle body along upper and lower rails by a driving torque of a motor inside a case, securing a rotation trajectory of the door, and then a striker fixed to the hinge slider may be restrained by a latch portion fixed to the case to fix the slide movement position of the hinge slider.

Accordingly, it is possible to simultaneously to open or close both doors or to open/closing one door alone.

Furthermore, after the hinge portion of the door slides automatically in the external diagonal direction of the vehicle body along the hinge slider by the driving torque of the motor, even if a motor is not separately controlled, it is possible to maintain the slide movement position of the hinge slider in a fixed state by restraining the striker through the latch portion, stably achieving the door opening/closing operation.

Furthermore, the door hinge device for the vehicle according to various exemplary embodiments of the present disclosure maintains the advantage of good openness during the riding or leaving of passengers or leisure activities in an opposite swing door of a vehicle without a B pillar, and the door opening/closing sequence is not affected even during the opening/closing operation of each door.

Furthermore, the door hinge device for the vehicle according to various exemplary embodiments of the present disclosure is slim compared to use of a driving unit such as a conventional motor or a gooseneck type of hinge device, and does not require a free space according to the operation radius, there is also an advantage of including a lot of room in the body layout configuration.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
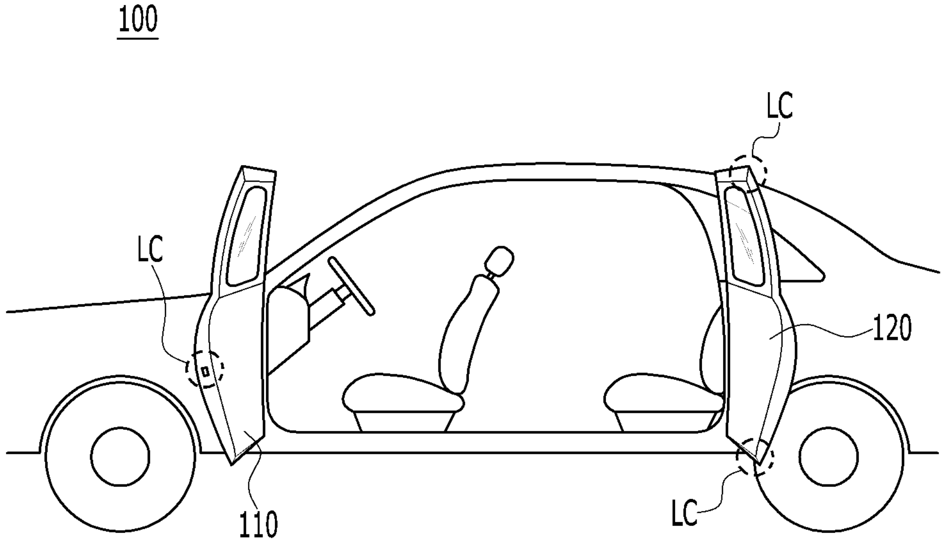
FIG. 1 is a side view showing a vehicle to which an opposing swing door according to an example of related art is applied.
Figure 2:
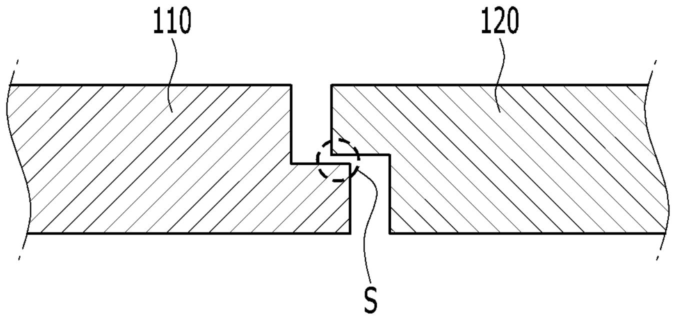
FIG. 2 is a cross-sectional view showing a part where a front door and a rear door are in contact in the vehicle of FIG. 1.
Figure 3:
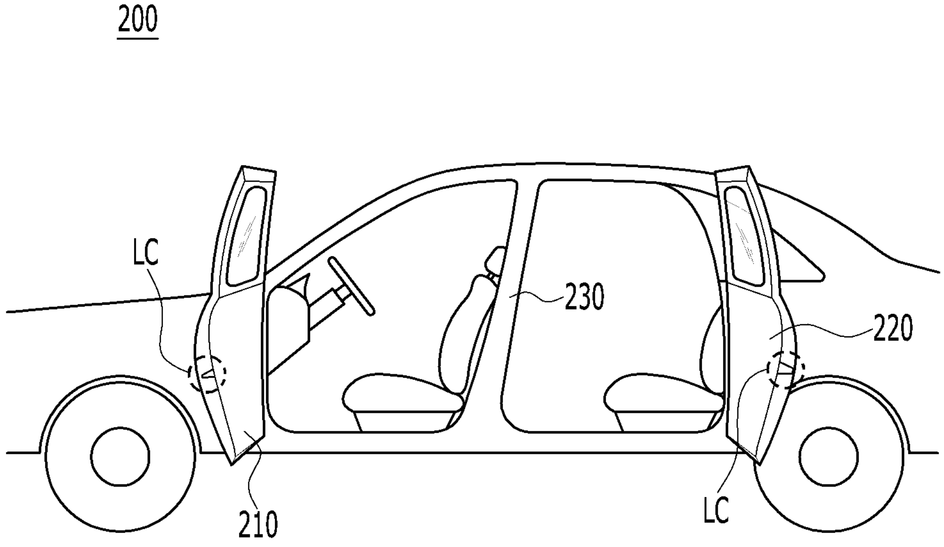
FIG. 3 is a side view showing a vehicle to which an opposing swing door according to another example of a related art is applied.
Figure 4:
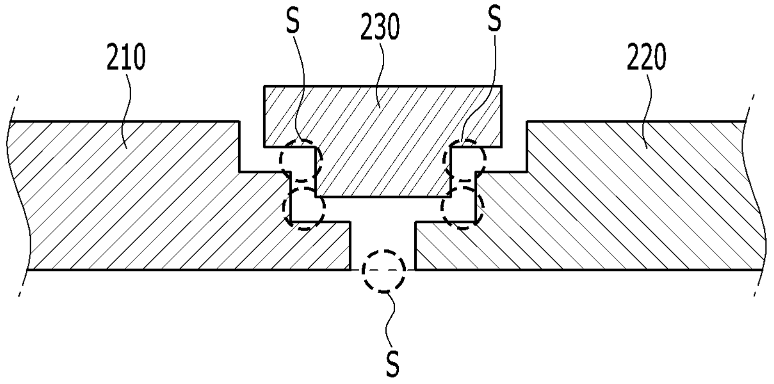
FIG. 4 is a cross-sectional view showing a part where a front door and a rear door are in contact with each other in a vehicle of FIG. 3.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, a various exemplary embodiments of the present disclosure will be described in detail with reference to the accompanying drawings.

However, because the size and thickness of each component shown in the drawings are arbitrarily indicated for convenience of explanation, the present disclosure is not necessarily limited to as shown in the drawings, and the thickness is enlarged or reduced to clearly express various parts and regions. Furthermore, to clearly describe various exemplary embodiments of the present disclosure, parts that are irrelevant to the description are omitted.

Figure 5:
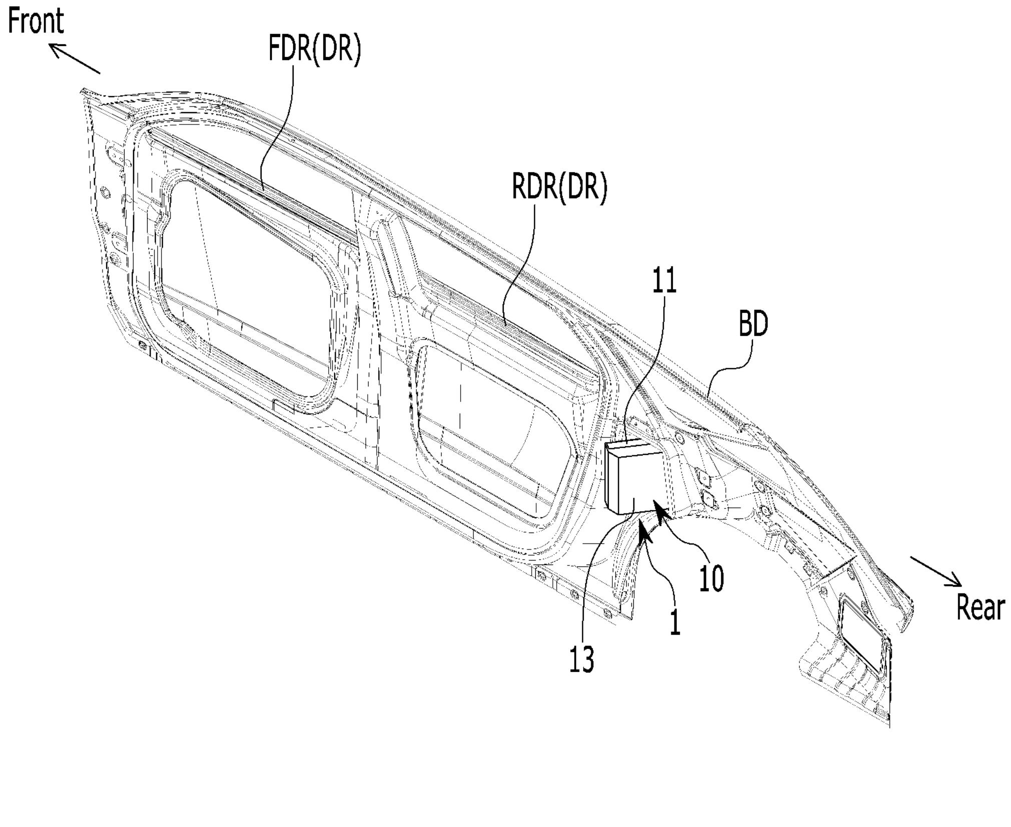
FIG. 5 is an inside perspective view of a vehicle door to which a door hinge device for a vehicle according to various exemplary embodiments of the present disclosure is applied.

In describing various exemplary embodiments of the present disclosure, for convenience of explanation, an upper left direction in FIG. 5 is defined as the front, and the lower right direction is defined as the rear. Furthermore, an example in which a door hinge device for a vehicle according to various exemplary embodiments of the present disclosure is applied to a rear door of a rear of a passenger seat is described.

Figure 6:
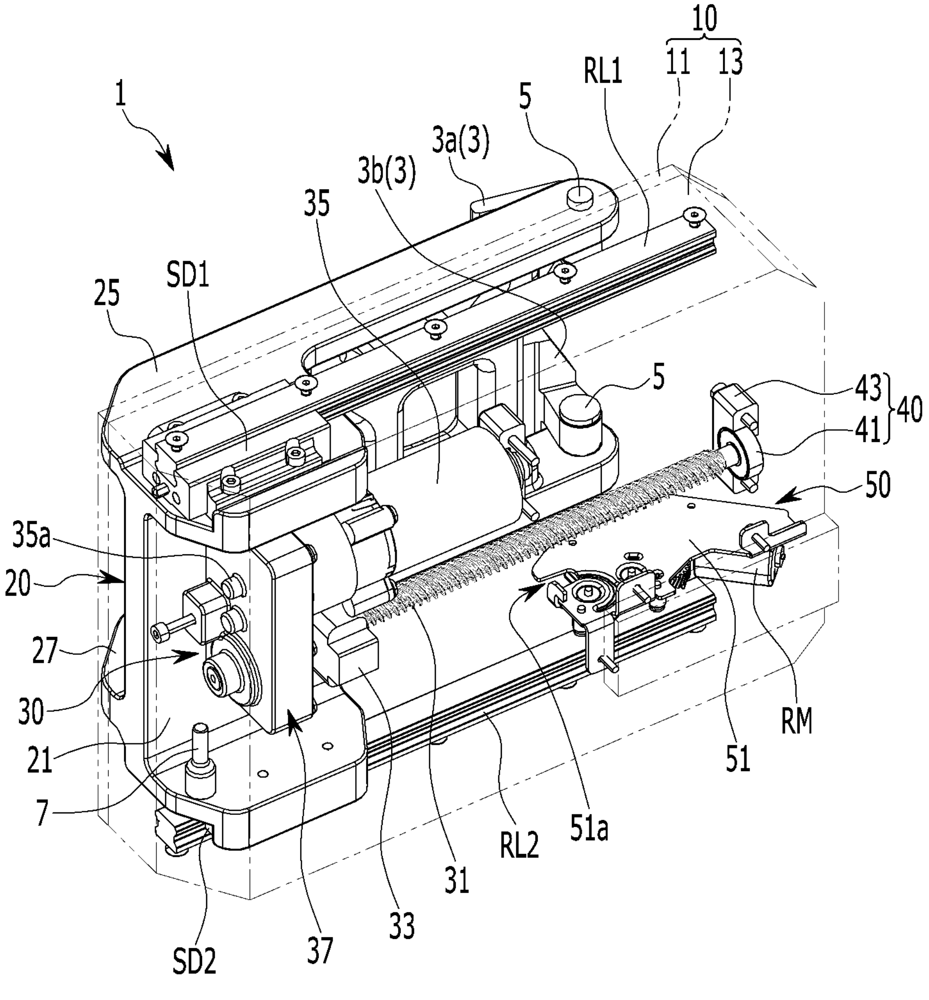
FIG. 6 and FIG. 7 are perspective views projecting a case of a door hinge device for a vehicle according to various exemplary embodiments of the present disclosure.
Figure 7:
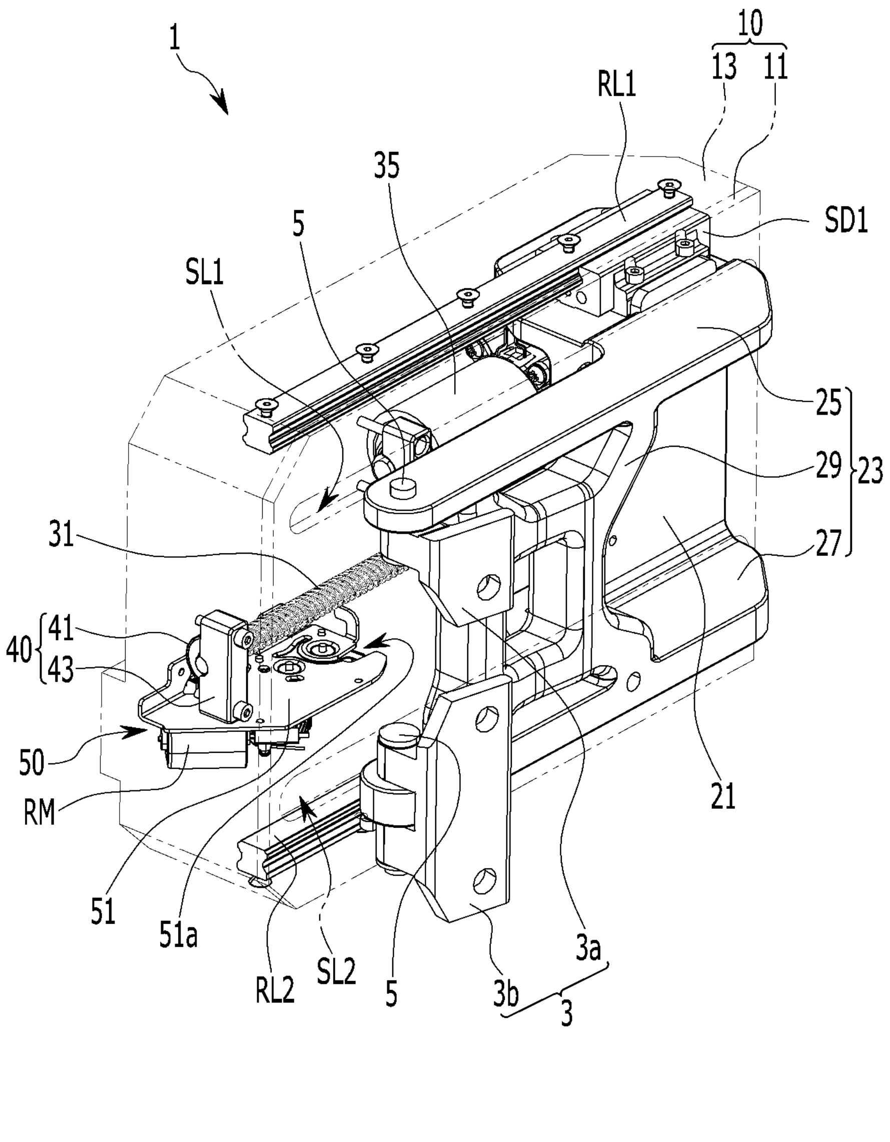
Figure 8:
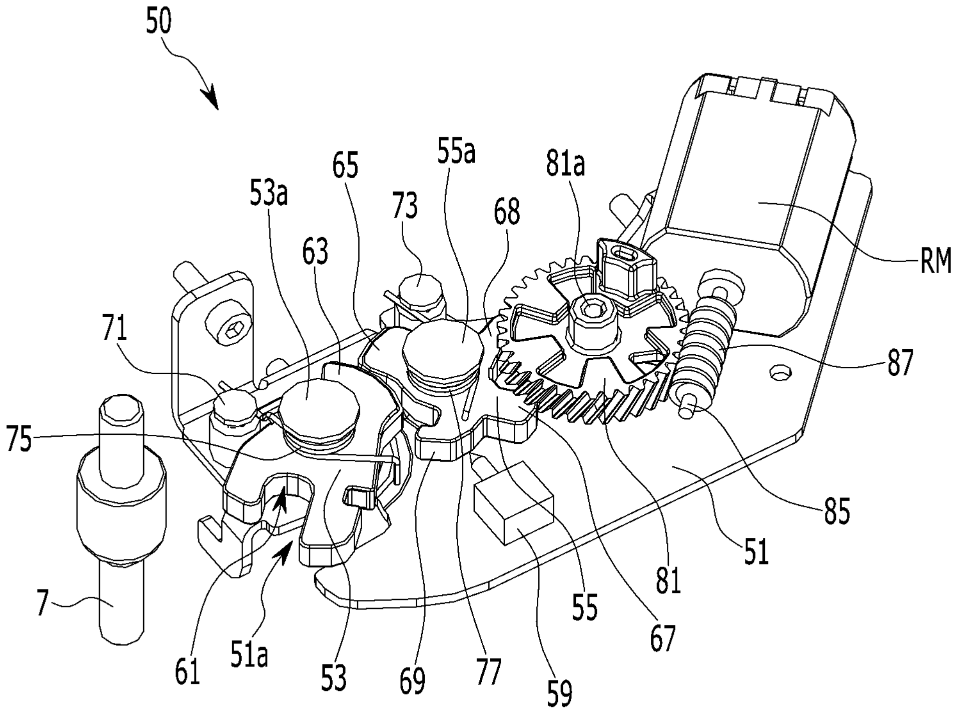
FIG. 8 and FIG. 9 are perspective views of a latch portion applied to a door hinge device for a vehicle according to various exemplary embodiments of the present disclosure.
Figure 9:
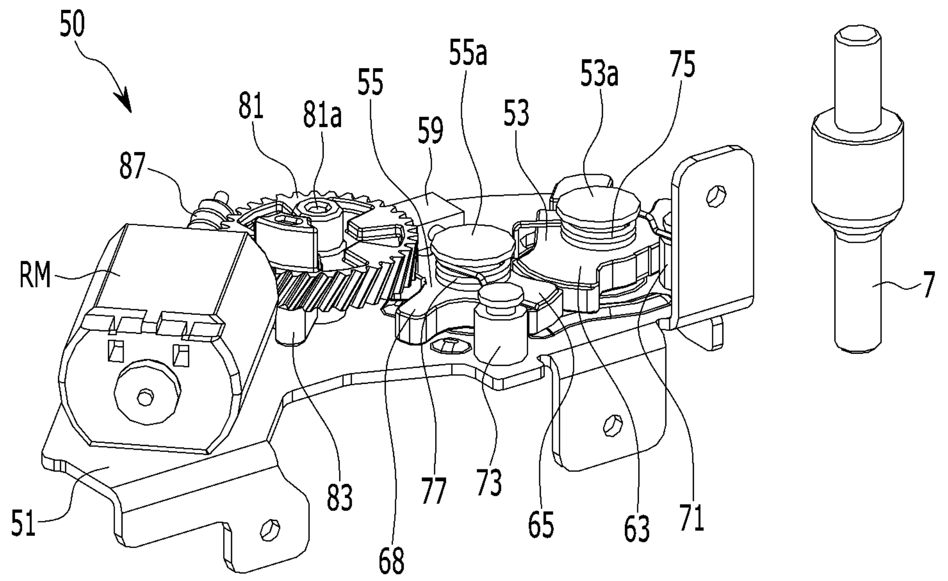

FIG. 5 is an inside perspective view of a vehicle door to which a door hinge device for a vehicle according to various exemplary embodiments of the present disclosure is applied, FIG. 6 and FIG. 7 are perspective views projecting a case of a door hinge device for a vehicle according to various exemplary embodiments of the present disclosure, and FIG. 8 and FIG. 9 are perspective views of a latch portion applied to a door hinge device for a vehicle according to various exemplary embodiments of the present disclosure.

The door hinge device for the vehicle 1 according to various exemplary embodiments of the present disclosure is referred to as an example which is applied to the rear door of the rear of the passenger seat of the passenger vehicle without a B pillar, however it is not limited thereto, and it may be applied between the front door FDR and the vehicle body BD on both sides of the passenger vehicle without a B pillar, and between the rear door RDR and the vehicle body BD on both sides.

That is, during the opening/closing operation of the door, while the front door FDR or the rear door RDR moves to the outside of the vehicle body BD in each diagonal direction of the front of the vehicle body BD or the rear of the vehicle body BD to secure the rotation trajectory of each door, it enables simultaneous opening/closing operation of both doors or an independent opening/closing operation of one door.

Referring to FIG. 5 to FIG. 9, a door hinge device for a vehicle 1 according to various exemplary embodiments of the present disclosure may include a case 10, a hinge slider 20, a driving unit 30, a striker 7, and a latch portion 50.

The case 10 is provided in a diagonal direction toward the outside of the vehicle body on one side of the vehicle body BD corresponding to one end portion of the door DR.

Here, the door DR may be a front door FDR or a rear door RDR, and may refer thereto simultaneously. That is, in the case of the front door FDR, one end portion may be one side of the front end portion of the front door FDR, and in the case of the rear door RDR, one end portion may be one side of the rear end portion of the rear door RDR.

Also, one side of the vehicle body BD to which the front door FDR is provided means one side of the front of the vehicle body BD, and in the instant case, the front door FDR may be provided in the diagonal direction toward the front outside of the vehicle body BD.

Furthermore, one side of the vehicle body BD on which the rear door RDR is provided means one side of the rear of the vehicle body BD, and in the instant case, the rear door RDR may be provided in a diagonal direction toward the rear outside of the vehicle body BD.

Furthermore, in the case 10, two guide slots SL1 and SL2 are formed on the external surface, and an upper rail RL1 and a lower rail RL2 are provided in the longitudinal direction on the upper and lower sides of, the interior, respectively.

That is, the case 10 is formed by assembling the external case 11 and the internal case 13 together.

The external case 11 faces the outside of the vehicle body BD, and the upper guide slot SL1 and the lower guide slot SL2 are formed in parallel to each other by cutting the upper and lower portions on the cross-section along the longitudinal direction, respectively.

The internal case 13 faces the interior of the vehicle body BD, and is mounted with the external case 11.

Also, the upper rail SL1 is disposed along the internal coupling portion of the external case 11 and the internal case 13 in the longitudinal direction to be fixed to the internal upper surface, and the lower rail SL2 is disposed along the internal coupling portion of the external case 11 and the internal case 13 in the longitudinal direction to be fixed to the internal lower surface.

Also, between the external case 11 and the internal case 13, the hinge slider 20 is provided through the upper rail RL1 and the lower rail RL2, and the driving unit 30 is provided on the internal cross-section of the internal case 13.

Also, on the inside between the external case 11 and the internal case 13, the latch portion 50 is provided on one side of the lower portion on the internal cross-section of the internal case 13.

The hinge slider 20 is slidably install along the upper rail RL1 and the lower rail RL2 through two sliders SD1 and SD2 inside the case 10, and is connected to the door hinge bracket 3 fixed to one end portion of the door DR through two guide slots SL1 and SL2 outside the case 10 through the hinge shaft 5.

That is, the hinge slider 20 includes an internal hinge slider 21 positioned inside the case 10 and an external hinge slider 23 positioned outside the case 10.

The internal hinge slider 21 includes an upper side which is slidably connected to the upper rail RL1 through the upper slider SD1 on the inside between the external case 11 and the internal case 13, and a lower side which is slidably connected to the lower rail RL2 through the lower slider SD2.

The external hinge slider 23 is integrally connected to the internal hinge slider 21 through the upper and lower guide slots SL1 and SL2 at the outside of the external case 11, and the front is hinged to the door hinge bracket 3 through the hinge shaft 5.

Here, the external hinge slider 23 is formed of an upper external hinge bar 25, a lower external hinge bar 27, and an external connection bar 29.

That is, the upper external hinge bar 25 is integrally connected to the upper one side of the internal hinge slider 21 at the outside of the external case 11 through the upper guide slot SL1 formed on the external surface of the external case 11.

The lower external hinge bar 27 is integrally connected to the lower one side of the internal hinge slider 21 at the outside of the external case 11 through the lower guide slot SL2 formed under the external surface of the external case 11.

Furthermore, the external connection bar 29 is formed by interconnecting the upper and lower external hinge bars 25 and 27 at the outside of the external case 11.

Also, the door hinge bracket 3 includes an upper door hinge bracket 3*a* and a lower door hinge bracket 3*b*.

That is, the upper door hinge bracket 3*a* is fixed to the upper side of one end portion of the door DR and is hinged to the front of the upper external hinge bar 25 through the hinge shaft 5.

Furthermore, the lower door hinge bracket 3*b* is fixed to the lower side of one end portion of door DR and is hinged to the front of the lower external hinge bar 27 through the hinge shaft 5.

Also, the driving unit 30 is configured so that a nut bracket 33 is provided on the screw 31 disposed in the longitudinal direction at the inside of the exterior and internal cases 11 and 13, the nut bracket 33 is connected to the internal hinge slider 21, and then the hinge slider 20 slides and moves along the upper and lower rails RL1 and RL2 by providing a driving torque by the driving of the motor 35.

That is, the driving unit 30 includes the motor 35, the reducer 37, the screw 31, and the nut bracket 33.

The motor 35 is mounted and fixed to one side on the internal cross-section of internal case 13.

Here, the motor 35 may apply a step motor configured for controlling a rotation speed and a rotating direction thereof.

The reducer 37 is configured on the motor shaft 35*a* of the motor 35 to reduce the torque of the motor 35 and output it.

Here, the reducer 37 may be configured in a known configuration to reduce the rotation speed of the motor shaft 35*a* through a reduction gear configured therein and transmit it to the screw 31.

The screw 31 is disposed parallel to the upper and lower rails RL1 and RL2 inside the case 10 so that one end portion thereof is connected to the output side of the reducer 37, and the other end portion thereof is rotatably provided on the internal cross-section of the internal case 13 through the bearing member 40.

Here, as for the bearing member 40, the bearing 41 that rotationally supports the other end portion of the screw 31 is engaged and fixed to the internal case 13 through the bearing block 43.

The nut bracket 33 is movably provided on the screw 31, and one side is fixed to the internal hinge slider 21.

That is, the nut bracket 33 transfers rotation power as forward and backward power so that the hinge slider 20 slides and moves along the upper and lower rails RL1 and RL2 while moving in the forward and backward directions on the rotating screw 31 by the rotation power of the motor 35.

Here, the screw 31 and the nut bracket 33 may be formed of a ball screw structure which is in contact with a cloud through a plurality of balls between them.

Also, the striker 7 is fixed on one side of the lower portion of the internal hinge slider 21 in the inside between the exterior and internal cases 11 and 13.

Here, the striker 7 may be formed in a rod shape, and is positioned to be constrained to the latch portion 50 while sliding and moving along the internal hinge slider 21 in the diagonal direction on the outside of the vehicle body.

Referring to FIG. 8 and FIG. 9, the latch portion 50, in the inside between the exterior and internal cases 11 and 13, is provided on the lower one side of the internal cross-section of the internal case 13 corresponding to the bearing member 40.

This slide latch portion 50 operates to restrain the striker 7 or release the restraint through a claw lever 53 and a pawl lever 55 at the position where the hinge slider 20 slides and moves in the diagonal direction outside the vehicle body.

That is, the latch portion 50 includes a base plate 51, a claw lever 53, a pawl lever 55, a release gear 81, and a release motor RM, and then the base plate 51 is fixed to the internal cross-section of the internal case 13 so that the hinge slider 20 restrains the striker 7 through the claw lever 53 while sliding and moving in the diagonal direction on the outside of the vehicle body.

The base plate 51 is fixed to one side of the lower portion of the internal hinge slider 13, and an insert groove 51*a* is formed on one surface corresponding to the striker 7.

The claw lever 53 is rotatably coupled to the base plate 51 through a pin 53*a* to be rotatable by corresponding to the internal side of the insert groove 51*a*. Furthermore, a restraining groove 61 for restraining the striker 7 is formed on one side of the claw lever 53, and a latching end portion 63 protruded for limiting a unidirectional rotation is formed on the other side thereof.

The pawl lever 55 is rotatably coupled to the base plate 51 through a pin 55*a* by corresponding to one side of the claw lever 53.

The pawl lever 55 has a supporting end portion 65 protruded to act on the latching end portion 63 on one side, and a release end portion 67 protruded on the other side thereof. Also, a detecting end portion 69 protruded on one side between the supporting end portion 65 and the release end portion 67 is formed, and a damping end portion 68 protruded on the other side between the supporting end portion 65 and the release end portion 67 is formed.

The release gear 81 is rotatably provided on the base plate 51 through a gear shaft 81*a* by corresponding to one side of the pawl lever 55. Also, on the lower side of the release gear 81, a release protrusion 83 acting on the release end portion 67 of the pawl lever 55 is formed.

The release motor RM is adjacent to the release gear 81 and fixed to the base plate 51. Furthermore, in the release motor RM, the motor gear 87 provided on the motor shaft 85 is engaged with the release gear 81 to transmit rotation power.

Here, the release gear 81 may include a worm wheel, and the motor gear 87 may include a worm.

This latch portion 50 further includes a pole switch 59 that detects the rotation position of the pawl lever 55. The pole switch 59 is fixed to the base plate 51 by corresponding to the detecting end portion 69 of the pawl lever 55.

The pole switch 59 may detect a rotation position of the pawl lever 55 and output the rotation position signal of the pawl lever 55 to control the operation of the release motor RM according to the signal.

Also, the latch portion 50 further includes a claw damper 71, a pole damper 73, a claw spring 75, and a pole spring 77.

The claw damper 71 is provided to one side of the base plate 51 by corresponding to one surface of the latching end portion 63 of the claw lever 53, and supports one surface of the claw lever 53 to reduce a contact noise while suppressing the unidirectional rotation.

Also, the pole damper 73 is provided to the other side of the base plate 51 by corresponding to one surface of the damping end portion 68 of the pawl lever 55 and supports the damping end portion 68 of the pawl lever 55 to reduce the contact noise while suppressing the unidirectional rotation.

The claw spring 75 is inserted into the pin 53*a* of the claw lever 53 and is provided to elastically support the claw lever 53 in the rotation direction to release the restraint of the striker 7.

Also, the pole spring 77 is inserted into the pin 55*a* of the pawl lever 55 and is provided to elastically support the pawl lever 55 in the rotation direction in which the supporting end portion 65 supports the latching end portion 63 of the claw lever 53.

Next, a detailed operation of the door hinge device for the vehicle according to various exemplary embodiments of the present disclosure is described with reference to FIG. 10, FIG. 11, and FIG. 12, and FIG. 13.

Figure 10:
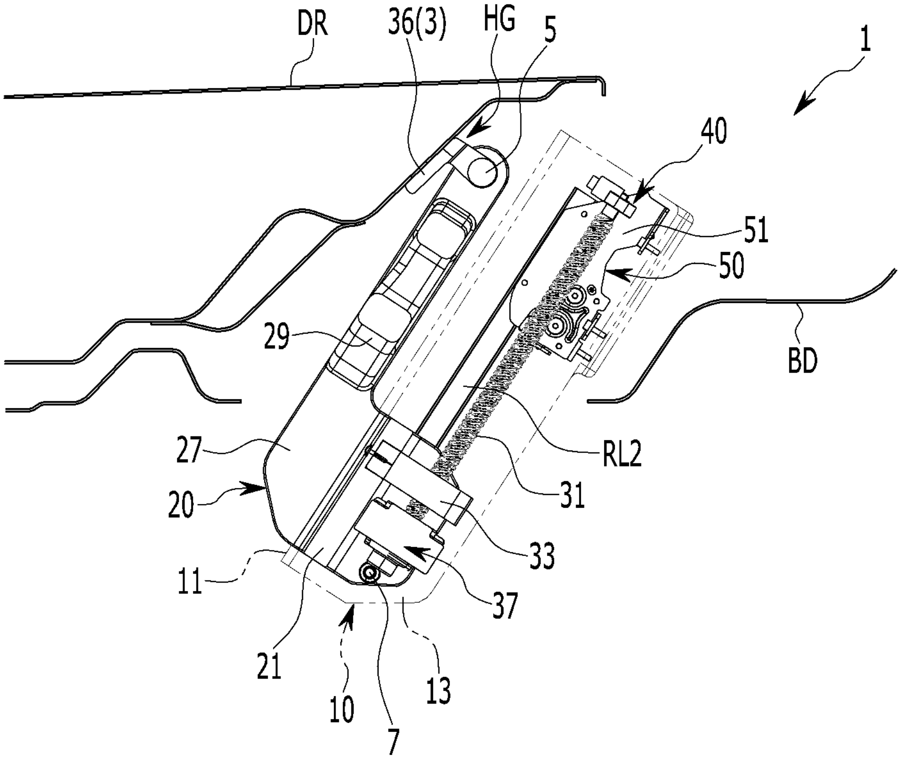
FIG. 10, FIG. 11, and FIG. 12 are flat cross-sectional views showing a step-by-step operation state of a door hinge device for a vehicle according to various exemplary embodiments of the present disclosure.
Figure 11:
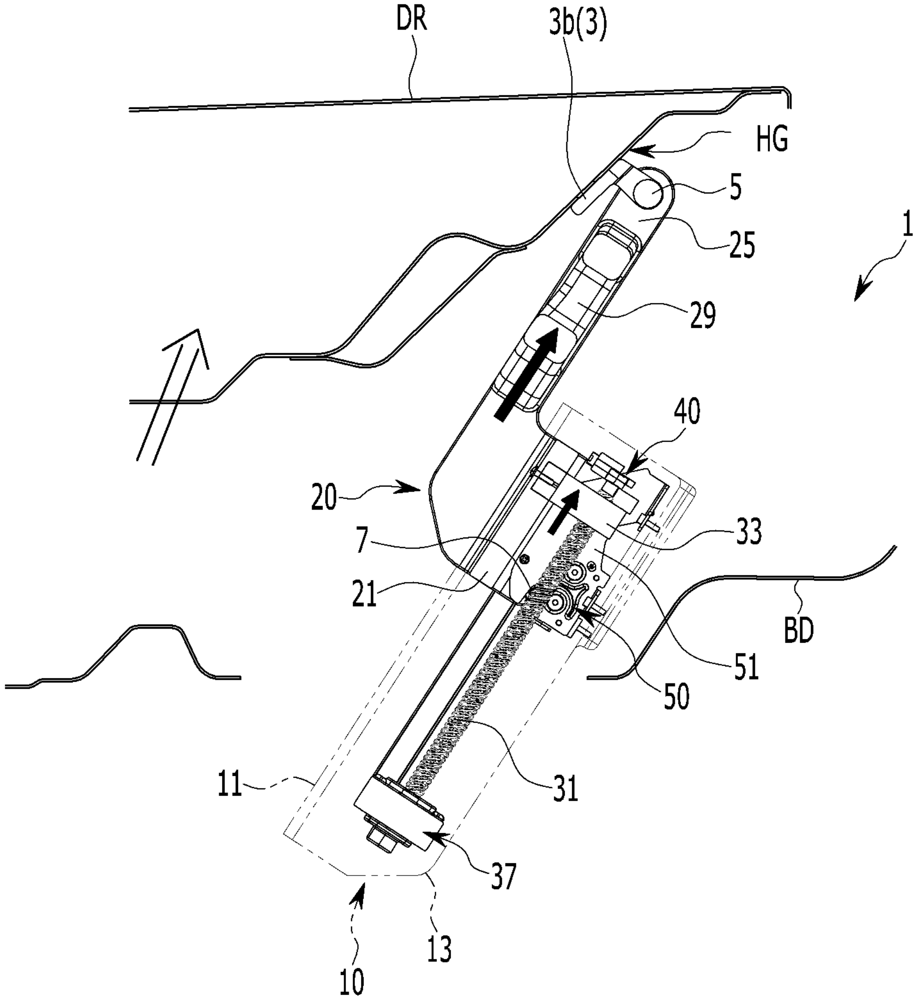
Figure 12:
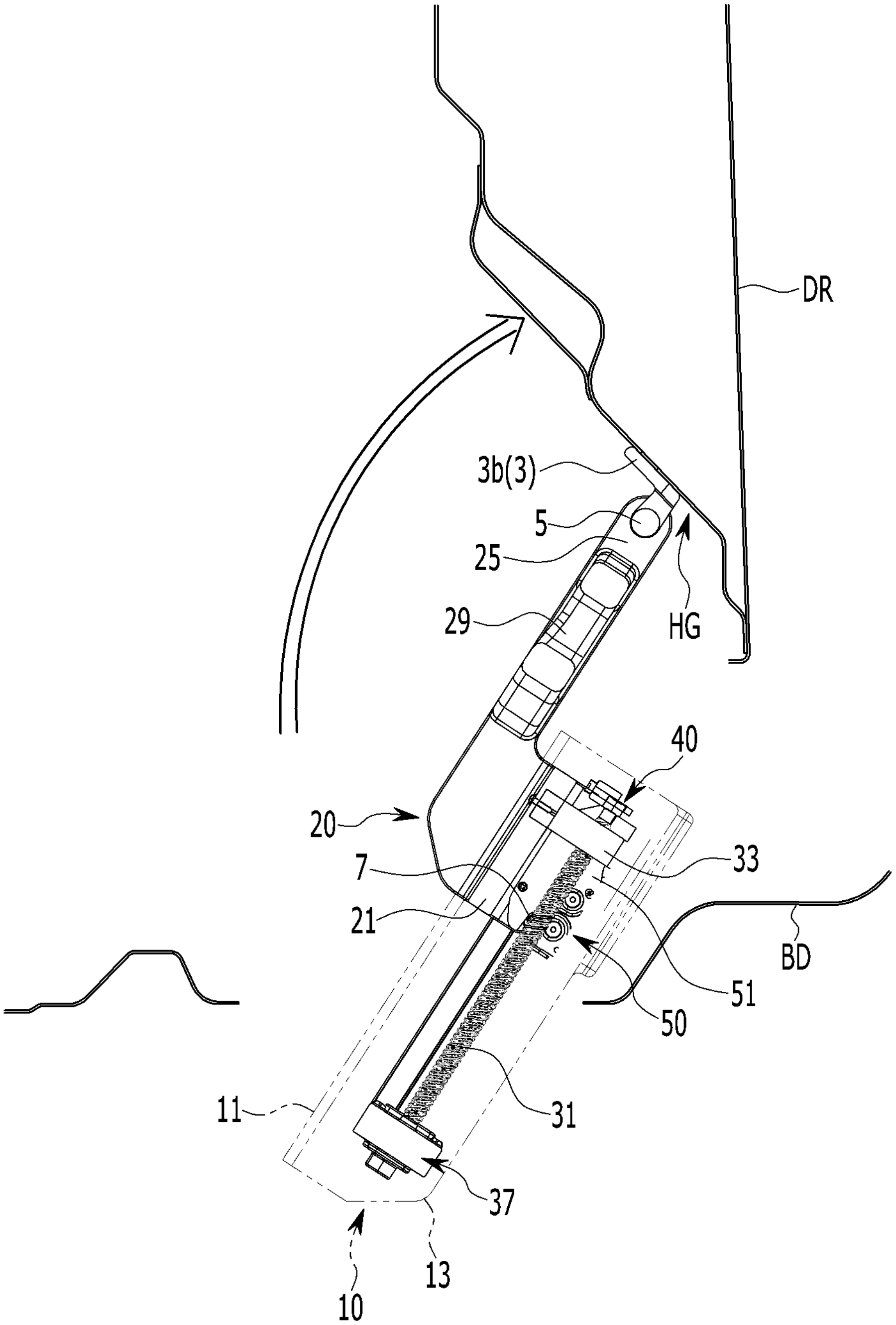
Figure 13:
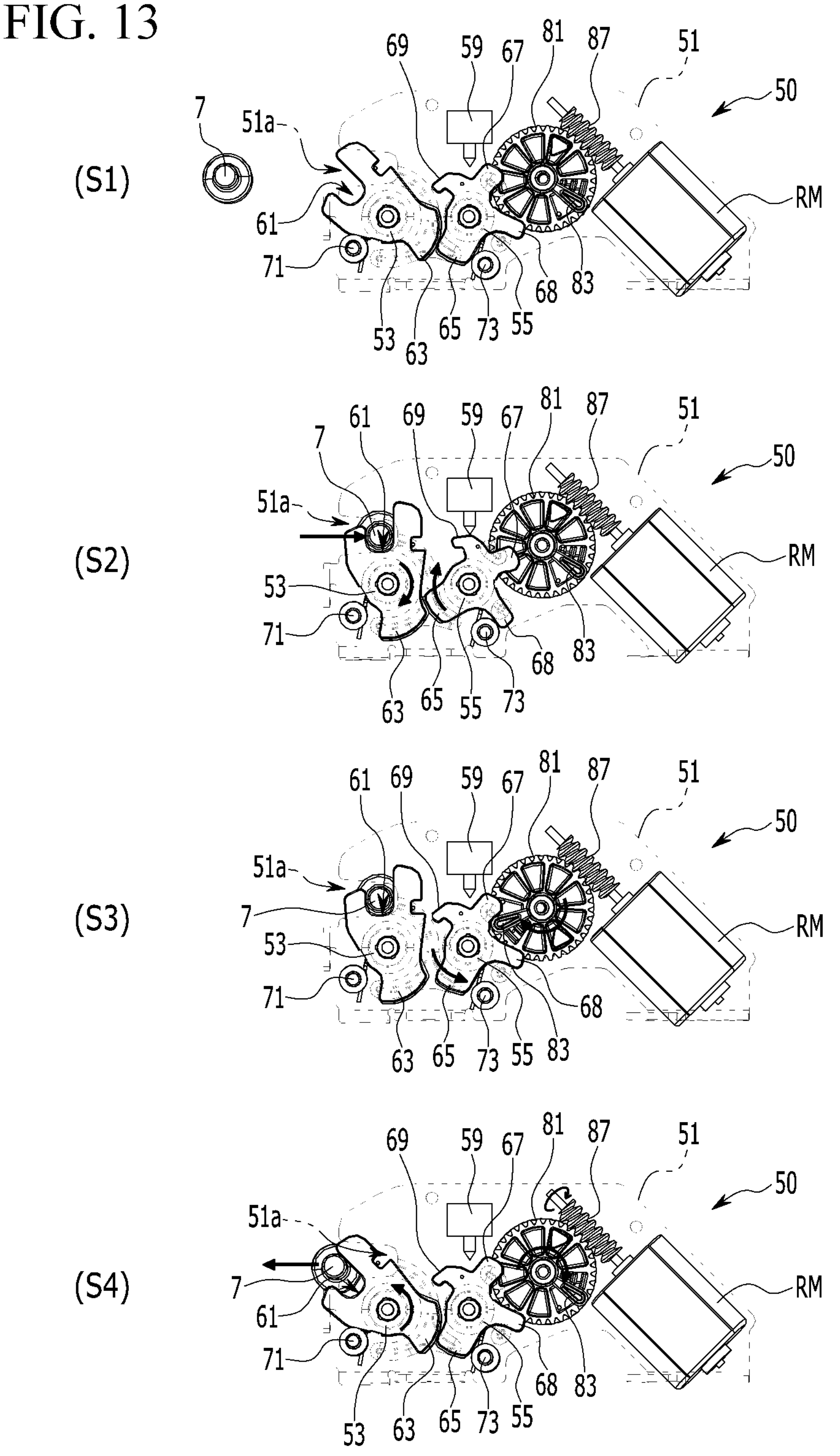
FIG. 13 is a step-by-step operation state diagram of a latch portion applied to a door hinge device for a vehicle according to various exemplary embodiments of the present disclosure.

FIG. 10, FIG. 11, and FIG. 12 are flat cross-sectional views showing a step-by-step operation state of a door hinge device for a vehicle according to various exemplary embodiments of the present disclosure, and FIG. 13 is a step-by-step operation state diagram of a latch portion applied to a door hinge device for a vehicle according to various exemplary embodiments of the present disclosure.

First, referring to FIG. 10, the door DR is in a closed state.

At the present time, as a state in which the hinge shaft 5 connecting the door DR and the vehicle body BD is moved in the inside diagonal direction of the vehicle body BD together with the hinge slider 20, the hinge portion HG of the door DR is the position where the door DR is kept closed.

In the instant case, referring to a step (S1) of FIG. 13, the latch portion 50 is in a state in which the supporting end portion 65 of the pawl lever 55 breaks away from the latching end portion 63 of the claw lever 53, the claw lever 53 is rotated by the claw spring 75 so that the restraining groove 61 of the claw lever 53 is in an open state toward the insert groove 51*a* of the base plate 51.

Also, the pole switch 59 is separated from the detecting end portion 69 of the pawl lever 55 and does not output the detection signal, and the release protrusion 83 on the release gear 81 is in the opposite side position with respect to the release end portion 67 of the pawl lever 55.

Referring to FIG. 11, as above-described, in the state that the door DR is closed, to open the door DR, the screw 31 is rotated through the reducer 37 by driving the first motor 35. Accordingly, the nut bracket 33 connected on the screw 31 moves along the screw 31 in the external diagonal direction of the vehicle body BD.

Accordingly, the hinge slider 20 fixed and connected to the nut bracket 33 slides and moves along the upper and lower rails RL1 and RL2 together with the nut bracket 33 in the external diagonal direction of the vehicle body BD.

At the present time, the hinge slider 20 moves the upper and lower door hinge brackets 3*a* and 3*b* respectively hinged to the fronts of the upper and lower external hinge bars 25 and 27 of the external hinge slider 23 through the hinge shaft 5 in the external diagonal direction of the vehicle body BD.

Accordingly, for the door DR, as the hinge portion HG with the vehicle body BD moves in the external diagonal direction of the vehicle body BD, the rotation trajectory is secured without interference with the vehicle body BD or the other door DR.

At the present time, referring to a step (S2) of FIG. 13, as the striker 7 on the hinge slider 20 is inserted into the insert groove 51*a* on the base plate 51, the latch portion 50 is restrained in the restraining groove 61 by the rotation of the claw lever 53.

That is, the latching end portion 63 pushes the supporting end portion 65 while the claw lever 53 is rotated by the force with which the striker 7 is inserted, as the pawl lever 55 is rotated while overcoming the elastic force of the pole spring 77 and the rotation is restored in the opposite direction by the elastic force, the supporting end portion 65 is in a position to support the latching end portion 63.

At the present time, the pole switch 59 may output a detection signal by being operated by the detecting end portion 69 of the pawl lever 55.

Accordingly, in the state that the latch portion 50 restrains the striker 7, the door DR is fixed in the state where the hinge portion HG with the vehicle body BD slides in the external diagonal direction of the vehicle body BD.

Referring to FIG. 12, in the present way, when the door DR is opened with the state that the rotation trajectory of the door DR is secured, the door DR is opened around the hinge shaft 5 without the interference.

On the other hand, because the operation to close the door DR is performed opposite to the operation to open the door DR, the detailed description is omitted, but the operation of the latch portion 50 for opening the door DR is referred to as follows.

To close the door DR, as shown in a step (S3) of FIG. 13, first, the release motor RM is driven to rotate the release gear 81.

Accordingly, the release protrusion 83 formed on the lower side of the release gear 81 pushes the release end portion 67 of the pawl lever 55 so that the supporting end portion 65 is separated from the latching end portion 63 of the claw lever 53.

In the present state, when the motor 35 of the driving unit 30 is driven in the reverse direction, the screw 31 is rotated in the reverse direction through the reducer 37. Accordingly, the nut bracket 33 moves in the internal diagonal direction of the vehicle body BD along the screw 31, and the hinge slider 20 slides and moves along the upper and lower rails RL1 and RL2 together with the nut bracket 33 in the internal diagonal direction of the vehicle body BD.

At the present time, referring to a step (S4) of FIG. 13, for the latch portion 50, as the striker 7 escapes from the insert groove 51*a* on the base plate 51, the claw lever 53 is rotated by the elastic force of the claw spring 75, and the striker 7 is released from the restraining from the restraining groove 61.

At the present time, the supporting end portion 65 of the pawl lever 55 maintains the supporting release position of the latching end portion 63 of the claw lever 53, and the pole switch 59 is separated from the detecting end portion 69 of the pawl lever 55 and enters the initial state of not outputting the detection signal.

Accordingly, in the door hinge device for the vehicle 1 according to various exemplary embodiments of the present disclosure, in the vehicle without the B pillar, the hinge slider 20 connected to the hinge portion HG of the door DR slides and moves in the external diagonal direction of the vehicle body BD along the upper and lower rails RL1 and RL2 by the driving torque of the motor 35 inside the case 10, securing the rotation trajectory of the door DR. At the instant time, the striker 7 on the hinge slider 20 is restrained by the latch portion 50 on the case 10 to fix the slide movement position of the hinge slider 20.

Therefore, it ensures the stability of the opening/closing operation after the slide movement of each door DR, and each door DR may independently operate to be opened or closed.

Also, after the hinge portion HG of the door DR slides automatically along the hinge slider 20 in the external diagonal direction of the vehicle body BD by the driving torque of the motor 35, even when there is not separate control of the motor 35, the slide movement position of the hinge slider 20 may be fixed in the state that the striker 7 is restrained through the latch portion 50.

For convenience in explanation and accurate definition in the appended claims, the terms “upper”, “lower”, “inner”, “outer”, “up”, “down”, “upwards”, “downwards”, “front”, “rear”, “back”, “inside”, “outside”, “inwardly”, “outwardly”, “interior”, “exterior”, “internal”, “external”, “forwards”, and “backwards” are used to describe features of the exemplary embodiments with reference to the positions of such features as displayed in the figures. It will be further understood that the term “connect” or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A door hinge apparatus for a vehicle, including a case provided on one side of a vehicle body corresponding to one end portion of a door in a diagonal direction of the vehicle body toward an outside of the vehicle body, rails disposed in a longitudinal direction on upper and lower sides of the case, respectively, and a hinge slider connected through a hinge axis to a door hinge bracket fixed to the one end portion of the door in a slidably provided state along the rails disposed inside the case, the door hinge apparatus comprising:

a striker provided on one side of the hinge slider; and a latch portion including a claw lever, a pawl lever and a base plate, wherein the latch portion is provided on one side of the case inside the case, and configured for restraining or releasing the striker through the claw lever and the pawl lever at positions where the hinge slider slides and moves in an external diagonal direction of the vehicle body, wherein the claw lever and the pawl lever are positioned on the base plate.

2. The door hinge apparatus of claim 1, wherein the door includes a front door or a rear door of the vehicle, and wherein the one end portion of the door includes a front end portion of the front door or a rear end portion of the rear door.

3. The door hinge apparatus of claim 1, further including a driving unit including:

a screw disposed in the longitudinal direction of the case;

a nut bracket, wherein the hinge slider is connected to an inside of the case through the nut bracket on the screw; and a motor providing a driving torque so that the hinge slider slides and moves along the rails according to driving of the motor.

4. The door hinge apparatus of claim 3, wherein the motor is fixed on an internal cross-section of the case, wherein the screw is disposed parallel to the rails and including a first end portion engaged to the motor and a second end portion provided rotatably on the internal cross-section of the case, and wherein the nut bracket is movably provided on the screw and one side of the nut bracket is fixed to the hinge slider.

5. The door hinge apparatus of claim 4, wherein the driving unit further includes:

a reducer engaged to a motor shaft of the motor to reduce the driving torque of the motor and output the reduced driving torque;

wherein the screw includes a first end portion connected to the reducer and a second end portion provided rotatably on the internal cross-section of the case through a bearing member.

6. The door hinge apparatus of claim 1, wherein the striker is fixed to a lower side of the hinge slider.

7. The door hinge apparatus of claim 1, wherein in the latch portion, in a state that the hinge slider slides and moves in the external diagonal direction of the vehicle body, the base plate is fixed to an internal cross-section of the case to restrain the striker through the claw lever.

8. The door hinge apparatus of claim 7, wherein the base plate is fixed to one side of an internal cross-section of the case and includes an insert groove formed on one side of the base plate corresponding to the striker, wherein the claw lever includes a restraining groove formed on a first side of the claw lever to restrain the striker and a protruding latching end portion formed on a second side of the claw lever to limit unidirectional rotation, and is rotatably pin-coupled to the base plate, and wherein the pawl lever includes a supporting end portion formed on a first side of the pawl lever and acting to the latching end portion, a release end portion formed to be protruded on a second side of the pawl lever, and a damping end portion formed to be protruded on a side of the pawl lever between the supporting end portion and the release end portion, and the pawl lever is rotatably pin-coupled to the base plate and disposed at one side of the claw lever.

9. The door hinge apparatus of claim 8, wherein the latch portion further includes:

a release gear rotatably provided on the base plate through a gear shaft and including a release protrusion formed on a lower side of the release gear and acting on the release end portion of the pawl lever; and a release motor fixed to the base plate adjacent to the release gear and including a motor gear gear-engaged to the release gear and fixed to a motor shaft.

10. The door hinge apparatus of claim 9, wherein the release gear includes a worm wheel, and the motor gear includes a worm.

11. The door hinge apparatus of claim 9, wherein the pawl lever further includes a detecting end portion formed to be protruded on a side of the pawl lever between the supporting end portion and the release end portion.

12. The door hinge apparatus of claim 11, wherein the latch portion further includes a pole switch fixed to the base plate by corresponding to the detecting end portion of the pawl lever to detect a rotation position of the pawl lever.

13. The door hinge apparatus of claim 9, wherein the latch portion further includes:

a claw damper provided on a first side of the base plate to suppress rotation of the claw lever by supporting one side of the claw lever; and a pole damper provided on a second side of the base plate to suppress rotation of the pawl lever by supporting the damping end portion of the pawl lever.

14. The door hinge apparatus of claim 9, wherein the latch portion further includes:

a claw spring mounted onto a pin of the claw lever and elastically supporting the claw lever in a rotation direction to release a restraint of the striker; and a pole spring mounted onto a pin of the pawl lever and elastically supporting the pawl lever in a rotation direction where the supporting end portion supports the latching end portion of the claw lever.

15. The door hinge apparatus of claim 1, wherein the hinge slider includes:

an internal hinge slider, wherein upper and lower sides of the internal hinge slider are slidably connected along the rails, respectively, inside the case; and an external hinge slider integrally connected to the internal hinge slider through a guide slot formed on an external surface of the case outside the case and including an end portion hinged to the door hinge bracket through a hinge shaft.

16. The door hinge apparatus of claim 15, wherein the external hinge slider includes:

an upper external hinge bar integrally connected to an upper one side of the internal hinge slider through an upper guide slot formed on the external surface of the case outside the case;

a lower external hinge bar integrally connected to a lower one side of the internal hinge slider through a lower guide slot formed under the external surface of the case outside the case; and an external connection bar interconnecting the upper and lower external hinge bars outside the case.

17. The door hinge apparatus of claim 16, wherein the door hinge bracket includes:

an upper door hinge bracket fixed to an upper side of the one end portion of the door and hinged to a front end portion of the upper external hinge bar through a hinge shaft; and a lower door hinge bracket fixed to a lower side of the one end portion of the door and hinged to a front end portion of the lower external hinge bar through a hinge shaft.

* * * * *